(12) United States Patent
Linkewitsch

(10) Patent No.: US 7,124,154 B2
(45) Date of Patent: Oct. 17, 2006

(54) CLOCK DIVIDER

(75) Inventor: Niklas Linkewitsch, Evessen (DE)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 10/299,589

(22) Filed: Nov. 18, 2002

(65) Prior Publication Data

US 2004/0098430 A1    May 20, 2004

(51) Int. Cl.
*G06F 7/52* (2006.01)
*H03K 21/00* (2006.01)

(52) U.S. Cl. .................. 708/103; 327/115; 377/47
(58) Field of Classification Search ............ 708/103, 708/271, 273

See application file for complete search history.

(56) References Cited

U.S. PATENT DOCUMENTS

| 6,114,915 A * | 9/2000 | Huang et al. ............. 331/25 |
| 6,329,850 B1 * | 12/2001 | Mair et al. .............. 327/107 |
| 6,639,435 B1 * | 10/2003 | Holzle ................... 327/115 |

\* cited by examiner

*Primary Examiner*—Chuong D. Ngo
(74) *Attorney, Agent, or Firm*—Grossman, Tucker, Perreault & Pfleger, PLLC

(57) ABSTRACT

A low speed clock divider that behaves like a high speed clock divider is provided. The clock divider includes a software-configurable low-speed component for waveform generation and a high-speed component linked to the low-speed component, the high-speed component providing an output signal by serializing a waveform received from the low-speed component.

5 Claims, 4 Drawing Sheets

CLOCK DIVIDER

BACKGROUND

Clocking circuits are used for a variety of purposes in digital circuits on both board level systems and integrated circuit (IC) devices. For example, global clock signals are used to synchronize various circuits across the board or IC device. Many complex digital systems, such as microprocessors and field programmable gate arrays (FPGAs), have multiple clock signals at different frequencies. For example, in some microprocessors, internal circuits are clocked by a first clock signal at a first clock frequency while input/output (I/O) circuits are clocked by a second clock signal at a second, different clock frequency.

Multiple clock generating circuits can be used to generate the multiple clock signals. However, most systems use one clock generating circuit to derive other clock signals from the first clock signal. For example, clock dividers are used to generate one or more clock signals of lower clock frequencies from a reference clock. Typically, clock dividers divide the frequency of the reference clock signal by an integer value.

DETAILED DESCRIPTION

Figure 1:
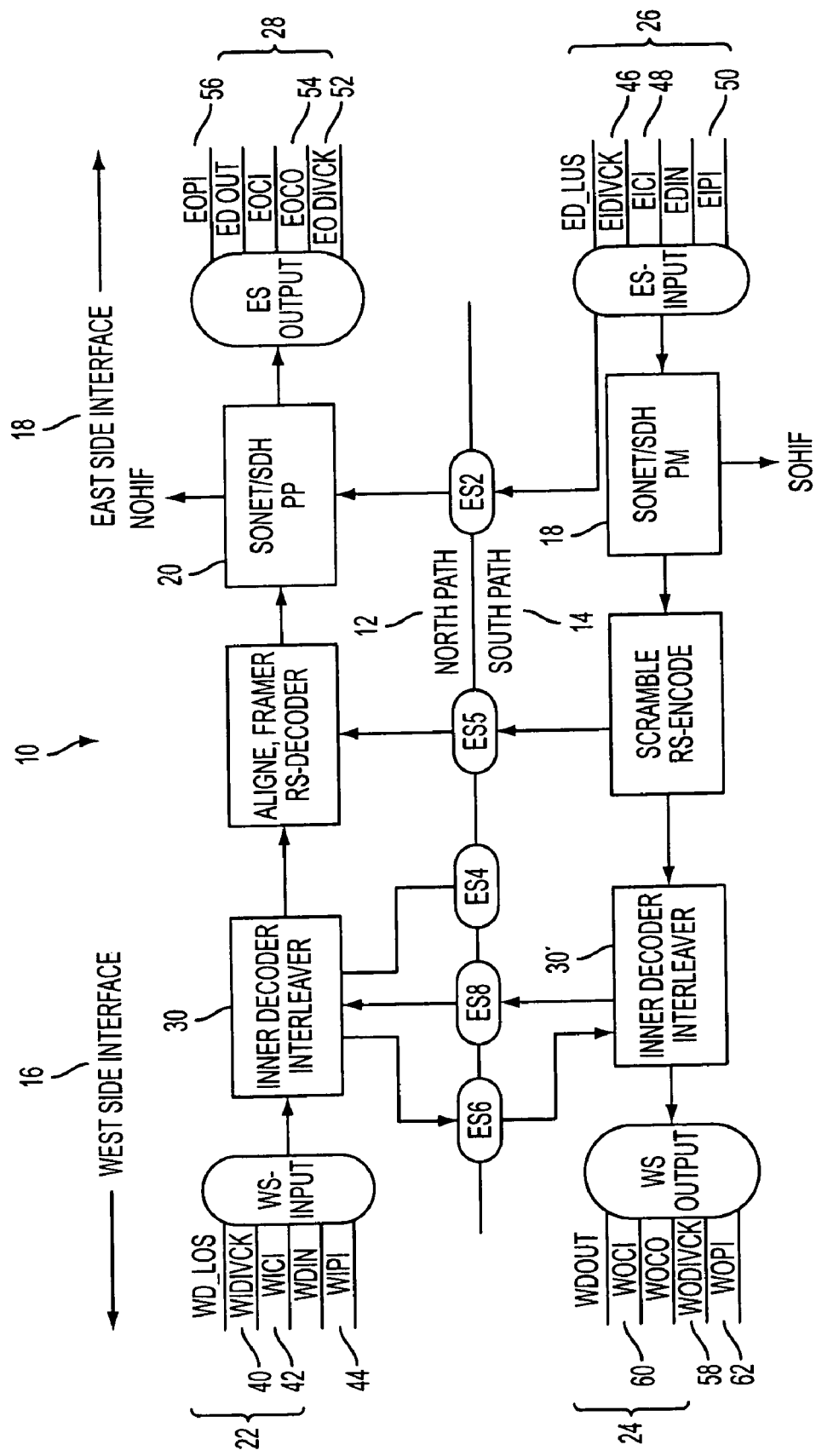
FIG. 1 is a block diagram of an exemplary digital wrapper device.

Referring to FIG. 1, an exemplary device that uses multiple derived clock signals, e.g., an error correcting device 10 (hereinafter "device 10") is shown. The device 10 is a fully compliant G. 709 digital wrapper device that covers most Optical Transport Network (OTN) applications on a single chip. The device 10 is built on a technology developed, for example, the Intel® IXF30001 (FEC100), a 10 Gbit/s forward error correcting (FEC) digital wrapper device. The device 10 supports enhanced FEC using concatenated Reed-Solomon codes (RS-codes) that can be set to up to achieve up to a 9 dB gain using various parameters.

The device 10 is designed for optical transmission applications where the coding gain reached with standard Forward Error Correcting (FEC) algorithms (ITU-T G. 975, ITU-T G.709) is not sufficient. The core FEC technology concatenates two Reed-Solomon codes that are configurable in both error correction capability and block length, delivering a coding gain configuration between zero and 30 percent overhead.

The device 10 includes two separated signal paths referred to as a north path 12 and a south path 14, and two interfaces referred to as a west side interface 16 and east side interface 18. While the north path 12 is primarily designed to operate as a line receiver, the south path 14 may be used as a line transmitter. The device 10 forms the basis of a single chip transponder application and, using integrated bridges between both paths 12,14 may be configured as a regenerator and provide Automated Protection Switching (APS) support.

The device 10 provides basic functions required for an OTN system, and appropriate configuration of outer code ensures compliance with a digital signal wrapping technique defined by International Telecommunication Union Telecommunications Standardized Sector (ITU-T).

The device 10 supports both asynchronous and synchronous mapping schemes and has additional features for Synchronous data Transmission on Optical Media/Synchronous Digital Hierarchy (SONET/SDH) data streams such as a Performance Monitor (PM) 18 and post processor 20. The device input/outputs (I/Os) 22, 24, 26, 28 are compliant with Optical Internet working Forum (OIF) standards.

Synchronous and asynchronous mapping of STM-64 streams is supported for SDH payload data, as proposed by ITU-T G.709. In addition to ITU-T G.709 compliant framing, the device 10 may also be combined with any other outer code configuration.

Outer and inner RS-Codes are concatenated in the device 10 through the use of an interleaver 30,30', enabling correction of in multiple-wavelength DWDM systems.

The integrated, nonintrusive PM 18 in the south path 14 is used to check incoming payload signal quality by monitoring the B1 and B2 values contained in the regenerator section and line overhead. Monitoring also includes J0 string extraction and mapping of up to four configurable OH bytes to the processor interface. On the north path 12, the integrated SOH post processor 20 allows SONET/SDH specific processing. Should severe transmission error occur, such as loss of signal or wrapper frame synchronization, received SONET/SDH data may be replaced by AIS frames.

The device 10 is controlled by a processor interface, i.e., west side interface 16 and east side interface 18, allowing event-driven communication to reduce processor load. An included IEEE 1149.1 (JTAG) (not shown) interface may be used to access the internal register bank.

The west side interface 16 includes the west side (ws) input port 22 and the ws output port 24. The east side interface 18 includes the east side (es) input port 26 and the es output port 28. Each port 22,24,26,28 includes a clock divider that performs a frequency division that can be configured between 7 and 65535. Depending on a configuration, each path 12, 14 can include three clock domains. Clocking for modules (not shown) directly connected to the west side interface 16 and the east interface 18 is served by external circuitry (not shown). An intermediate clock domain used for outer code processing in the example of a complete signal de-wrapping is generated internally. This also holds for the generation of an intermediate payload clock when in an asynchronous regeneration/bridge mode.

Different device configurations also require high speed I/O interfaces to run at different data rates. A clean generation of the driving clocks is performed by adding external circuitry. The device 10 supports synchronous payload mappings by providing programmable clock dividers at all interfaces 22, 24, 26, 28 in addition to the control port derived from elastic stores in the outer code (de-)wrapper.

A west side input clock is internally divided and returned to the outside via a WIDIVCK signal 40. The clock divider may either be driven by a WICI signal 42 or via a separate input WIPI signal 44.

An east side input clock is internally divided and returned to the outside via a EIDIVCK signal 46. The divided clock may either be driven by a EICI signal 48 or via a separate input EIPI signal 50.

An east side output clock is internally divided and returned to the outside via a EODIVCK signal 52. The divided clock may either be driven by a EOCI signal 54 or via a separate input EOPI signal 56.

A west side output clock is internally divided and returned to the outside via a WODIVCK signal 58. The divided clock may either be driven by a WOCI signal 60 or via a separate input WOPI signal 62.

The four clock dividers, one at each of the ports 22, 24, 26, 28, are used to implement a gear box or circuitry that derives a frequency from an initiated frequency while maintaining a certain rate. Each clock divider, as mentioned above, performs a frequency division that can be configured between 7 and 65535. A typical gear box with a rate of n/m is implemented by combining two of the programmable clock dividers in a phase lock loop (PLL).

Figure 2:
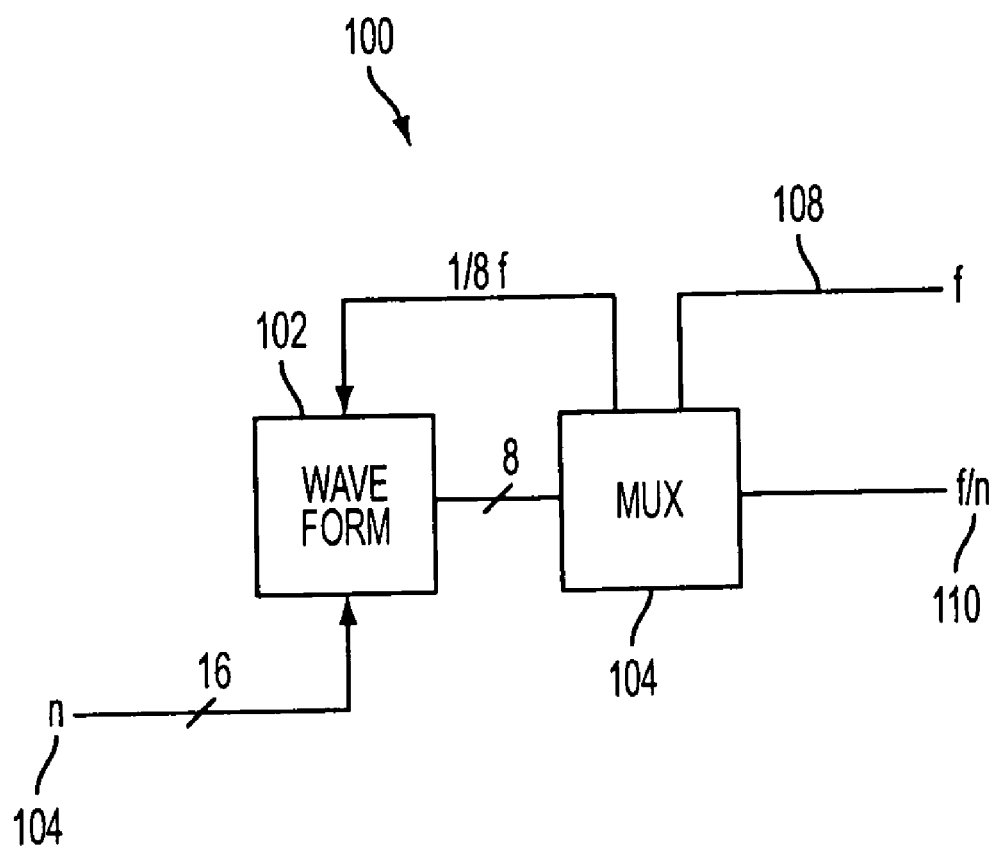
FIG. 2 is a block diagram of a clock circuit.

Referring to FIG. 2, a clock circuit 100 includes a waveform generator 102 and a serial multiplexer 104. A low speed component 106 is software configurable and provides waveform generation. The low speed component 106 is a non-critical part developed with a standard ASIC debug and testing flow. A high-speed component 108 provides an output signal 110 by serializing the waveform using the serial multiplexer 104.

Unlike clock circuit 100, most clock dividers are only used for high-speed critical tasks and thus there is no low speed component 106. The circuit 100 uses a standard serial multiplexer 104 that is found in the common library of most ASIC vendors, thus reducing development time and time to market.

Figure 3:
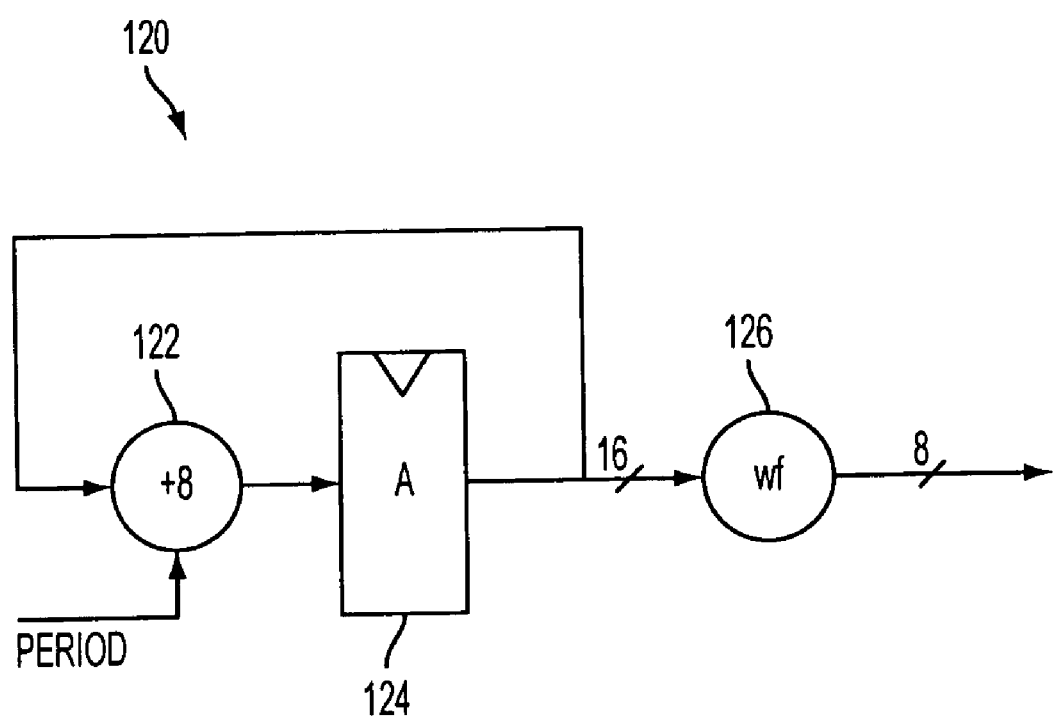
FIG. 3 is a block diagram of a waveform generator.

Referring to FIG. 3, the waveform generator 102 includes an 8-bit parallel waveform generator circuit 120 having an adder 122, a counter 124 and a waveform function 126. The adder 122 adds 8, if overflow, subtracts the period P. The waveform function 126 generates a Johnsson coded 8-bit output according to a 16-bit phase. Table 1 below is a logic table for possible values of A (counter 124) and Wf(A) 126 for period=P.

TABLE 1

| Value of A | Wf (A)   | Position of bit slice                  |
|------------|----------|----------------------------------------|
| 0          | 00000000 | 111111...1111111100...000<u>00000000</u> |
| 1          | 00000001 | 111111...1111111100...0000<u>0000000</u> |
| 2          | 00000011 | 111111...1111111100...00000<u>000000</u> |
| 3          | 00000111 | 111<u>111</u>...1111111100...000000<u>00000</u> |
| ...        | ...      | ...                                    |
| P/2 − 1    | 11111111 | 111111...<u>11111111</u>100...000000000000 |
| P/2        | 11111111 | 111111...1<u>11111111</u>00...000000000000 |
| P/2 + 1    | 11111110 | 111111...11<u>1111111</u>00...000000000000 |
| P/2 + 2    | 11111100 | 111111...111<u>111111</u>00...000000000000 |
| ...        | ...      | ...                                    |
| P − 2      | 00000000 | 111111...1111111100...00<u>0000000</u>00 |
| P − 1      | 00000000 | 111111...1111111100...000<u>00000000</u> |

A sequence of 8 bits (shown underlined in the third column) is sliced out of a constant cyclic sequence of bits. The value of A, indicated by underlining, is the position of the slice. A=0 means aligned right, A=1 means one step shifted (cyclic), A=2 means two steps shifted, and so forth. The eight underlined numbers are the definition of wf(A).

Table 2 below is a logic table for values of A (counter 124) over time for period P=20. The Wf( ) function 126 of Table 1 is used

TABLE 2

| Value of A | wf (A)   | Position of bit slice     |
|------------|----------|---------------------------|
| 0          | 00000000 | 11111111110<u>00000000</u>0 |
| 8          | 11111111 | <u>11111111</u>110000000000 |
| 16         | 11000000 | 1111111<u>11</u>10000000000 |
| 4          | 00001111 | <u>1111</u>111111000000<u>0000</u> |

TABLE 2-continued

| Value of A | wf (A)   | Position of bit slice     |
|------------|----------|---------------------------|
| 12         | 11111100 | 1111<u>11111</u>10000000000 |
| 0          | 00000000 | 11111111110<u>00000000</u>0 |
| ...        | ...      |                           |

Figure 4:
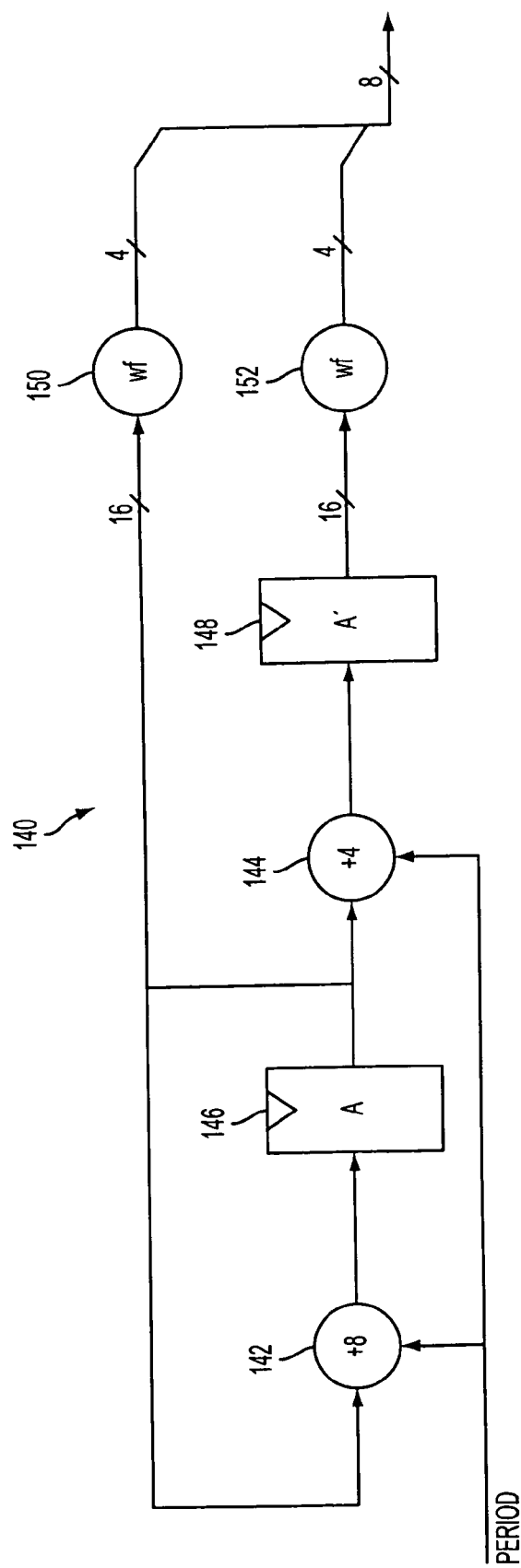
FIG. 4 is a block diagram of an alternate waveform generator.

Referring to FIG. 4, an alternate 8-bit parallel waveform generator circuit 140 for a period P greater than or equal to 6 includes two adders 142, 144, two counters 146, 148, and two waveform functions 150, 152. The adder 142 adds 8, if overflow, subtracts period P. The adder 144 adds 4, if overflow, subtracts period P. The waveform functions 150, 152 generate a Johnsson coded output according to a 16-bit phase. Possible output values are: 0000, 0001, 0011, 0111, 1111, 1110, 1100 and 1000.

Table 3 below lists a logic table of possible values of A and wf(A) for P=14.

TABLE 3

| Value of A | Wf (A) | Position of bit slice |
|------------|--------|-----------------------|
| 0          | 0000   | 11111110000<u>0000</u> |
| 1          | 0001   | <u>1</u>1111110000000<u>0</u>0 |
| 2          | 0011   | <u>11</u>1111100000<u>00</u> |
| 3          | 0111   | <u>111</u>1110000000<u>0</u> |
| 4          | 1111   | <u>1111</u>1110000000 |
| 5          | 1111   | 1<u>1111</u>110000000 |
| 6          | 1111   | 11<u>1111</u>11000000 |
| 7          | 1111   | 111<u>1111</u>1000000 |
| 8          | 1110   | 1111<u>111</u>0000000 |
| 9          | 1100   | 11111<u>11</u>0000000 |
| 10         | 1000   | 111111<u>1</u>0000000 |
| 11         | 0000   | 1111111<u>0000</u>000 |
| 12         | 0000   | 11111110<u>000</u>000 |
| 13         | 0000   | 111111100<u>00</u>000 |

Table 4 below lists a logic table of values of A and A' here P=14; the Wf( ) function of Table 3 is used.

TABLE 4

| Value of A' | Value of A | w (A'), wf (A) | Position of bit slice |
|-------------|------------|----------------|-----------------------|
| 10          | 0          | 1000, 0000     | 111111<u>1</u>0000000 |
| 4           | 8          | 1111, 1110     | <u>1111</u>1110000000 |
| 12          | 2          | 0000, 0011     | 1111110<u>000</u>0000 |
| 6           | 10         | 1111, 1000     | 11<u>1111</u>10000000 |
| 0           | 4          | 0000, 1111     | <u>1111</u>11100000<u>00</u> |
| 8           | 12         | 1110, 0000     | 1111<u>111</u>0000000 |
| 2           | 6          | 0011, 1111     | <u>11</u>111110000<u>00</u> |
| 10          | 0          | 1000, 0000     | 111111<u>1</u>0000000 |
| ...         | ...        | ...            |                       |

The circuit 140 is a derivative of circuit 120 that allows small values of P (i.e., P>=6). The 16-bit shadow counter A' 148 is ½ step delayed from 16-bit counter A 146. The two waveform functions 150, 152 with 4-bit each are combined to an 8-bit waveform slice 154.

What is claimed is:

1. A clock divider circuit comprising:
   a software-configurable low-speed component for waveform generation; and
   a high-speed component linked to the low-speed component, the high-speed component providing an output signal by serializing a waveform received from the low-speed component;

wherein the low-speed component comprises an 8-bit parallel waveform generator circuit.

2. The circuit of claim 1 in which the 8-bit output comprises a Johnsson coded output.

3. The circuit of claim 1 in which the high-speed component comprises an 8:1 serializer multiplexer.

4. The circuit of claim 2 in which the waveform generator circuit further comprises:

a cyclic adder providing input to a 16-bit counter;

a cyclic adder providing input to a 16-bit shadow counter that is one half step delayed from the 16-bit counter; and two waveform functions with 4-bit each whose output is combined to generate an 8-bit waveform slice.

5. The circuit of claim 4 in which the waveform functions generate a Johnsson coded output according to a 16-bit phase.

* * * * *

UNITED STATES PATENT AND TRADEMARK OFFICE
CERTIFICATE OF CORRECTION

| | | |
|---|---|---|
| PATENT NO. | : 7,124,154 B2 | Page 1 of 1 |
| APPLICATION NO. | : 10/299589 | |
| DATED | : October 17, 2006 | |
| INVENTOR(S) | : Linkewitsch | |

It is certified that error appears in the above-identified patent and that said Letters Patent is hereby corrected as shown below:

On the face page, in field (56), under "U.S. Patent Documents", in column 2, line 3, after "6,639,435" delete "B1" and insert -- B2 --, therefor.

In column 5, line 4, in Claim 1, delete "circuit." and insert -- circuit comprising an 8-bit adder linked to a counter, and a waveform function for receiving a 16-bit input from the counter and producing an 8 bit output. --, therefor.

In column 5, line 10, in Claim 4, after "claim" delete "2" and insert -- 1 --, therefor.

Signed and Sealed this

Twelfth Day of August, 2008

JON W. DUDAS
*Director of the United States Patent and Trademark Office*